Jan. 7, 1936.          W. B. BARNES          2,027,013
TRANSMISSION
Filed Oct. 7, 1933
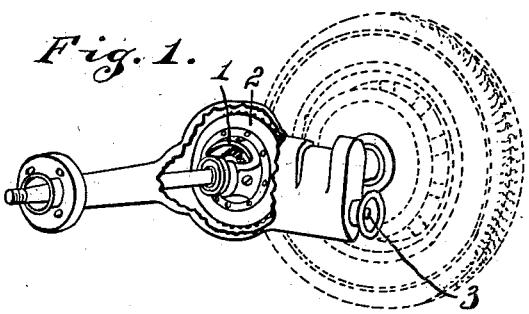
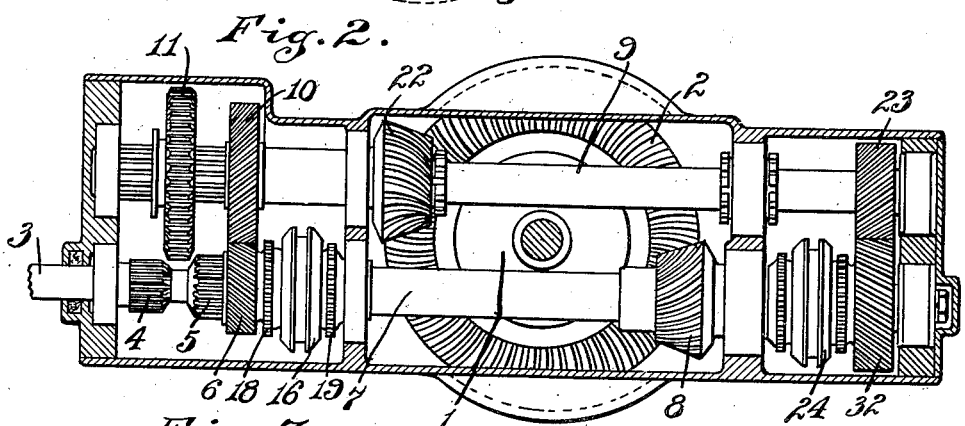
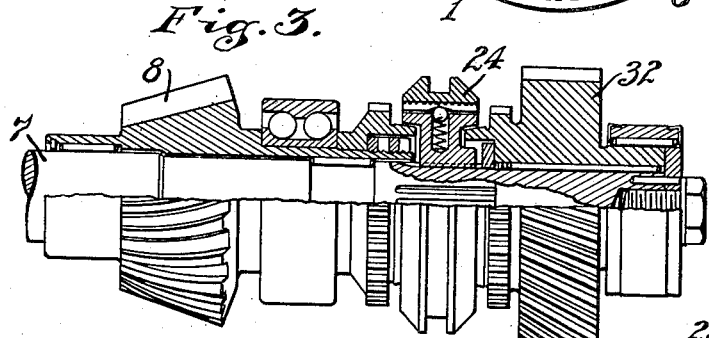
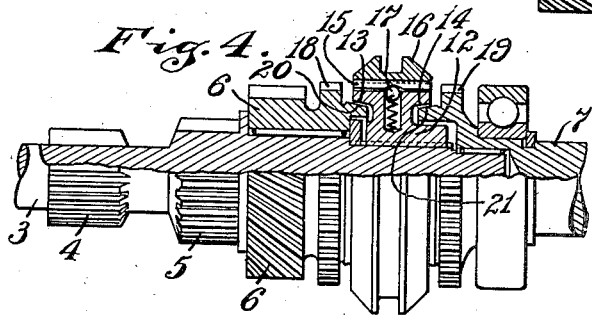
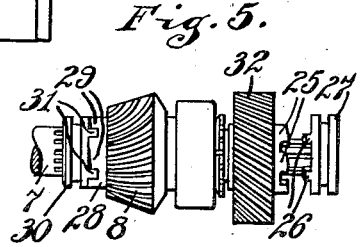
INVENTOR.
William B. Barnes,
BY
Hood + Hahn.
ATTORNEYS Patented Jan. 7, 1936

2,027,013

UNITED STATES PATENT OFFICE 2,027,013

TRANSMISSION

William B. Barnes, Indianapolis, Ind.

Application October 7, 1933, Serial No. 692,562

5 Claims. (Cl. 74—326)

My invention relates to improvements in transmissions for self-propelled vehicles and particularly to that type of transmission for imparting various gear speeds to the propelling wheels.

It is one of the objects of my invention to provide a transmission which will give a maximum number of speed changes with a minimum number of gears.

For the purpose of disclosing my invention I have illustrated certain embodiments thereof in the accompanying drawing in which Fig. 1 is a perspective view of a rear axle drive having associated therewith my improved type of transmission;

Fig. 2 is a side elevation of a transmission embodying my invention, the enclosing casing being shown in section;

Fig. 3 is a detail sectional view of the clutching mechanism for connecting the overspeed drive;

Fig. 4 is a longitudinal sectional view of the clutching mechanism connecting the second gear drive and Fig. 5 is a detail view of a modified clutching mechanism for the overspeed drive.

In the embodiment of the invention illustrated the rear axle drive comprises the usual differential drive 1 for driving the two rear axles. In the particular structure the driven ring gear 2 of this differential is of the hypoid gear type and receives the drive from the propeller shaft.

The propeller shaft 3 receives its drive direct from the engine through the instrumentality of the usual friction clutch and this shaft is provided with a reverse drive gear 4, and a low speed drive gear 5, these gears being fixed on the shaft. In addition to the low speed drive gear 5 there is provided a second speed drive gear 6 which is rotatably mounted on the shaft.

A driven shaft 7 is provided with a hypoid pinion 8 meshing with the ring gear 2. This shaft is driven directly from the shaft 3 or through the instrumentality of the gears 4, 5 and 6 operating through a counter shaft 9 having fixed thereon a second speed gear 10 and having splined thereon a low speed gear 11. For connecting the gear 6 to the shaft 3 or the shaft 3 directly to the shaft 7, I provide a suitable clutch which may be of the friction positive type and comprises a hub member 12 provided with oppositely-disposed friction faces 13 and 14 and provided on its periphery with splined teeth with which the teeth 15 of a ring member 16 mesh. This hub is splined on the shaft 3 to permit axial shifting thereof and is resiliently connected to the shiftable ring 16 through the instrumentality of the spring-pressed balls 17. The hub of the gear 6 is provided with clutch teeth, radially-disposed, 18 and similar clutch teeth 19 are formed on the shaft 7. With the shiftable ring 16 shifted to the left, looking at Fig. 4, the friction clutch face 13 will be first engaged with the friction clutch face 20 on the hub of the gear 6. This will tend to synchronize the gear with its shaft 3 and a continued shifting pressure on the ring 10 16 will release the spring-pressed balls 17, permitting the ring 16 to continue in its shifting movement to engage the teeth 15 with the teeth 18, thus locking the gear 6 to the shaft 3. Likewise a shifting to the right of the clutch member 15 16 will engage the friction face 14 with a friction face 21 on the shaft 7 and then engage the teeth 15 with the teeth 19 on the shaft, thereby directly connecting the two shafts 3 and 7 together.

The counter shaft 9 is provided with a hypoid 20 pinion 22 disposed on the opposite side of the vertical axis of the gear 2 and above the horizontal axis of the gear. Therefore, with the gear 11 shifted to mesh with the gear 5 a drive will be established from the shaft 3 through the gear 5, 25 at low speed, the gear 11, the shaft 9, pinion 22 and the ring gear 2, thus driving the ring gear of the differential at low speed. With the gear 11 shifted out of engagement with the gear 5 and the gear 6 connected to the shaft 3 through the 30 instrumentality of the clutch heretofore described, the drive will be through the shaft 3, the gear 6, the gear 10 and the counter shaft 9, thus driving the ring gear of the differential at second speed. It will be noted that in each instance when the 35 ring gear 2 is being driven at second or low speed the drive is through the counter shaft 9 and the pinion 22 mounted above the horizontal axis of the ring gear 2.

If it is desired to rotate or drive ring gear 2 40 in reverse, the shiftable gear 11 is shifted to the left to mesh with an idler gear (not shown) in turn meshing with the gear 4 whereby the drive will be in a reverse direction through the counter shaft 9. 45

To drive at high speed the shafts 3 and 7 are directly connected through the instrumentality of the clutch heretofore described and the drive will then take place through the shaft 3, the shaft 7 and the pinion 8 which, it will be noted, 50 is mounted below the horizontal axis of the ring gear 2.

So far there has been provided the usual three speeds forward and one speed in reverse which characterizes the normal drive of a commercial 55 automobile. Under certain conditions it is advantageous to provide an over-speed drive and to this end I provide on the shaft 7 an over-speed gear 32 which in turn meshes with a gear 23 mounted on shaft 9. This over-speed gear is rotatably mounted on the shaft 7 and is adapted to be connected thereto through the instrumentality of a synchronizing clutch 24 of the type described in connection with the gear 6 and this clutch not only is adapted to connect the gear 32 to the shaft 7 but is likewise adapted to connect the pinion 8 to the shaft 7 for the purpose of accomplishing the direct drive as heretofore described. With the shafts 3 and 7 directly connected, the gear 6 being therefore disconnected and the gear 32 connected to shaft 7, the pinion 8 being therefore disconnected from the shaft 7, an over-speed drive will be established through the shaft 3, the shaft 7, the gears 32 and 23, the shaft 9, pinion 22 to the ring gear 2. When, however, it is not desired to use the over-speed drive, the pinion 8 is connected to the shaft 7 through the instrumentality of the clutch 24 and the gear 32 is disconnected from the shaft 7 so that the over-speed drive gears 32 and 23 will not interfere with the driving operation of the remaining parts.

It is thus seen that with very few gears I am enabled to obtain a large number of speed variations. Due to the fact that the ring gear 2 and the pinions 8 and 22 are of the hypoid gear type, the shafts 9 and 7 may be set above and below the center of the ring gear 2, thereby accommodating one of the rear axles as the rear axle may be projected between these two shafts without interfering in any way with the operation of the parts.

In Fig. 5 I have illustrated a modification of the overspeed drive clutch means whereby the transmission may be shortened somewhat. In this structure I have provided a form of dental clutch although the synchronizing type of clutch may be used and as illustrated, the hub of the gear 32 is provided on its face with dental clutching teeth 25 which are adapted to be meshed with or engaged by the clutching teeth 26 on the axially-slidable clutch member 27 splined on the end of the shaft 7. The pinon 8 is rigidly mounted on a hub or sleeve 28 rotatable on the shaft 7. This sleeve is provided with dental clutch teeth 29 extending toward the center of the ring gear 2 and an axially-slidable collar 30 is splined on the shaft 7 within the ring gear, being provided with clutch teeth 31 for engagement with the teeth 29. In operation it is obvious that with the clutch teeth 29 and 31 disengaged and the teeth 25 and 26 engaged, the over-speed drive through the gears 32 and 23 will be the same as in the structure illustrated in Fig. 2. With the clutch teeth 25 and 26 disengaged and the teeth 29 and 31 engaged the transmission drive with the three speeds forward and the one reverse will be the same as is illustrated in Fig. 2.

I claim as my invention:

1. The combination with the ring gear of a differential, of a pair of driven shafts, a pinion rotatably mounted on one of said shafts and drivingly engaging said ring gear, a pinion fixed to the other of said shafts, a driving shaft, means for directly connecting said driving and first-mentioned shaft, means for drivingly connecting the pinion thereon with said shaft, two sets of speed-changing gears for driving the second-mentioned shaft and means for drivingly disengaging the pinion on said first-mentioned shaft when the second-mentioned shaft is driven by one of the sets of said speed-changing gears.

2. The combination with the ring gear of a differential, of a pair of driving shafts disposed on opposite sides of the horizontal axis of said gear, a pinion mounted on each of said shafts, said pinions being disposed on opposite sides of the vertical axis of said gear, a driving shaft in axial alignment with one of said driven shafts, a gear rotatably mounted on said driving shaft, a gear fixed on said second driven shaft and in constant mesh with the rotatably mounted gear, and a shiftable member for selectively connecting said aligned driving and driven shafts or for connecting said rotatably mounted gear with the driven shaft.

3. The combination with the ring gear of a differential, of a pair of driving shafts disposed on opposite sides of the horizontal axis of said gear, a pinion mounted on each of said shafts disposed on opposite sides of the vertical axis of said ring gear, a driving shaft in axial alignment with one of said driven shafts, a gear rotatably mounted on said driving shaft, a pair of gears fixed on said driving shaft, a gear mounted on the second of said driven shafts in constant mesh with said rotatably mounted gear, a sliding gear on said second shaft for establishing driving relation between said driving and second driven shaft through said fixed gears, and a shiftable member for selectively connecting said aligned driving and driven shafts or for connecting said rotatably mounted gear with the driven shaft.

4. The combination with the ring gear of a differential, of a pair of driving shafts disposed on opposite sides of the horizontal axis of said gear, a pinion mounted on each of said shafts disposed on opposite sides of the vertical axis of said gear, a driving shaft, a gear rotatably mounted on said driving shaft, a gear fixed on one of said driven shafts and in constant mesh with said rotatably mounted gear, a second gear fixed on said driven shaft on the opposite side of the vertical axis of said ring gear, a gear rotatably mounted on the other of said driven shafts and in constant mesh with said second-mentioned gear on the other driven shaft, one of said pinions being rotatably mounted on its shaft, shiftable means for selectively connecting the driving shaft to one of said driven shafts or for connecting the rotatably mounted gear with the driving shaft and shiftable means for selectively connecting the rotatably mounted pinion with its shaft or the second-mentioned rotatably mounted gear with its driven shaft.

5. The combination with a ring gear, of a pair of driven shafts disposed on opposite sides of the horizontal axis of said ring gear, a pinion on each of said shafts meshing with said ring gear, said pinions being disposed on opposite sides of the vertical axes of said gear, transmission gearing disposed on one side of the vertical axis of said gear for driving one of said driven shafts from the other, a driving shaft, a transmission gearing disposed on the opposite side of the vertical axis of said pinion gear for driving one of said shafts from the driving shaft, and means for establishing direct driving relation between the driving shaft and one of said driven shafts and means for establishing driving relation between said driven shaft and the other driven shaft through transmission gearing.

WILLIAM B. BARNES.